L. C. MARSHALL.
PISTON PACKING.
APPLICATION FILED AUG. 25, 1919.

1,412,251.

Patented Apr. 11, 1922.

Inventor
Lewis C. Marshall
by Roberts, Roberts & Cushman
his Attorneys

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

1,412,251.   Specification of Letters Patent.   Patented Apr. 11, 1922.

Application filed August 25, 1919. Serial No. 319,751.

*To all whom it may concern:*

Be it known that I, LEWIS C. MARSHALL, a citizen of the United States, and resident of Walpole, in the county of Norfolk and State of Massachusetts, have invented new and useful Improvements in Piston Packings, of which the following is a specification.

This invention relates to piston packings and while adapted to the packing of pistons generally, it is especially designed for the packing of pistons of internal combustion engines. In such engines in operation the cylinder is cooled while the piston is hot and the latter therefore expands more than the cylinder and must fit loosely within the cylinder to avoid binding. In order to maintain the high compression which is necessary, the piston is provided with packing rings which not only must fit tightly against the cylinder wall, but must make a tight joint with the groove of the piston within which the rings are disposed, to prevent leakage underneath the piston rings.

The principal object of the present invention is to provide a novel and improved metallic piston packing which shall accomplish these results and which shall also be simple in construction and free from multiplicity of parts and complexity of construction.

In the accompanying drawings which illustrate an embodiment of the invention,—

Figure 1:
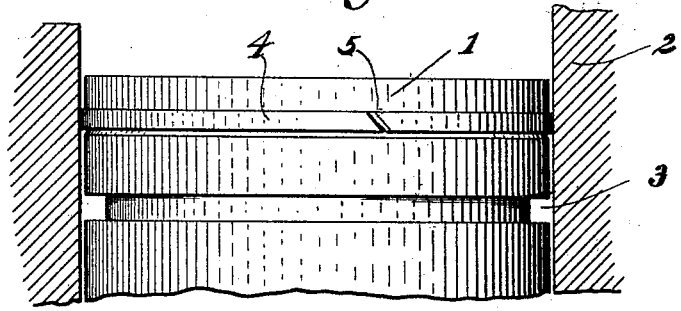
Figure 1 is a side elevation of the packing rings in place on a piston head.

Referring to the drawings 1 represents the piston head of an engine which is adapted to reciprocate within the bore of the cylinder 2. The piston head is provided with grooves 3 within which packings are positioned for forming a gas tight joint between the piston head and the cylinder wall. Each packing comprises a packing ring 4 of grey cast iron or other suitable material preferably having an external diameter substantially equal to the diameter of the bore of the cylinder 2. The ring 4 is divided at a single point 5 to enable it to be sprung slightly for insertion in the groove 3 and to enable it to expand against the cylinder wall, and is trapeziform in cross-section as most clearly shown in Fig. 3. The upper and lower faces 6 and 7 of the ring are parallel to each other and at right angles to the outer peripheral face 8. The inner peripheral face 9 of the ring 4 is beveled at a suitable angle to the outer face 8.

Resting upon the lower wall of the groove 3 is a second ring 10 substantially L-shaped in cross-section, that is, composed of two flanges, one a radially disposed base flange, and the other an upstanding flange at an acute angle to the base flange. Ring 10 is preferably made of gray cast iron but may be made of other suitable material. This ring is beveled upon its outer peripheral face 11 to the same extent as the inner face 9 of packing ring 4 and is adapted to make a tight joint therewith, and is preferably so constructed as to have an initial tendency to expand outwardly against the packing ring 4, although if desired this tendency might be eliminated. The upper surface of the base flange 12 constitutes a radial seat surface 14 upon which a spring steel forcer or follower ring 15 is positioned in contact with the inner beveled face of the flange 13 of the ring 10 at a point which is substantially opposite the mid-region of the beveled surface 11. By so positioning the follower ring 12, its expansive force is thereby directed against the central region of the packing ring 4, and the ring 4 is thereby urged more evenly against the wall of the cylinder and the wear is evenly distributed on its outer peripheral face. Furthermore any tendency of the ring to twist is eliminated and the upper face 6 of the packing ring is urged with an even bearing against the upper wall of the groove 3. The ring 10 not only serves to position the follower ring 15 in a position opposite the central region of the packing ring 4, but serves to offset any tendency of the packing ring to twist in the piston groove and so seals the joint between the ring 4 and the top wall of the piston groove 3.

Figure 2:
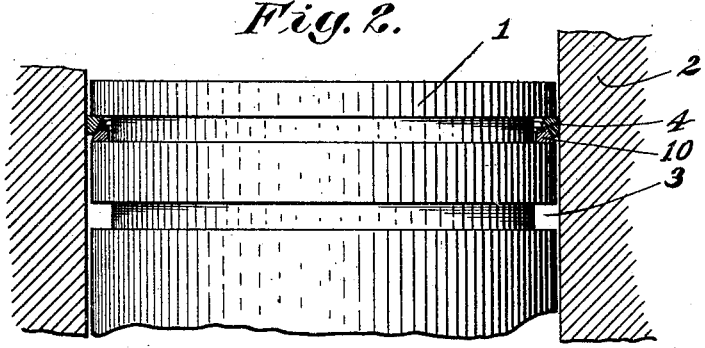
Figure 2 is a sectional view of said packing rings in place on a piston head.
Figure 3:
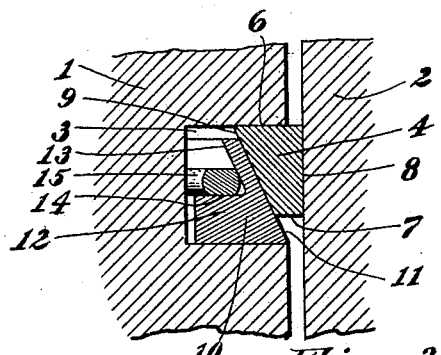
Figure 3 is an enlarged detail view in cross-section, illustrating the form of packing rings shown in Figs. 1 and 2.

The rings are assembled in the groove of the piston head in such position that the points of division of the rings break joint. When assembled in the groove of the piston head, as shown in Figs. 1, 2 and 3, the ring 4 fits against the cylinder bore and is urged into contact therewith by the ring 10 which in turn is expanded by the spring follower ring 15. One component of the force exerted against the beveled face 9 of the packing ring 4 tends to expand the ring 4 and thereby effect a tight closure between the periphery of ring 4 and the cylinder wall; while the other component of said force tends to thrust said packing ring bodily endwise with relation to the piston head 1 and thereby holds the face 6 in tight engagement with the upper wall of the groove 3. Thus the packing ring is maintained tight against loss of pressure both between the ring and the cylinder wall and underneath the ring between the ring and the piston head.

Figure 4:
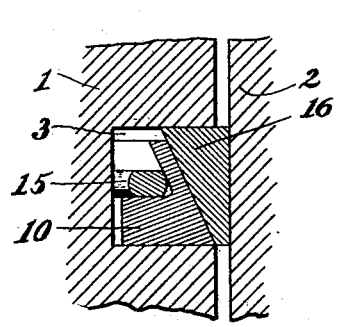
Figure 4 is an enlarged detail view in cross-section, illustrating a slight modification of the structure shown in Fig. 3.

In Fig. 4, I have illustrated a slightly modified form of packing which is substantially similar to the form illustrated in Fig. 3, except that the packing ring 16 is made as deep as the width of the groove 3 of the piston head.

While I have illustrated the spring follower ring 15 as formed from steel wire having both sides ground or drawn flat, it is to be understood that round steel wire or wire of any other suitable form of spring wire might be used.

From the foregoing description it is apparent that I have provided a piston packing comprising three rings one of which is a packing ring, the rings being held in such positions relative to each other that the packing ring is urged radially and upwardly with no tendency to twist within the piston head groove and in consequence presents its packing surfaces squarely against the piston head and cylinder walls with which they are designed to engage, thereby sealing the piston head to the cylinder by a gas tight joint.

I claim:

1. In combination, a piston having an annular groove therein, and a packing in said groove comprising a packing ring having a beveled face, a second ring having two angularly disposed flanges intersecting substantially in the middle of the longitudinal dimension of the ring and forming an annular radial seat surface on the inner peripheral face of said ring, one of said flanges having a beveled outer peripheral face cooperating with the beveled face of said packing ring and an inner beveled face overhanging said seat surface, and a spring follower ring supported upon said seat and adapted to urge said second ring outwardly against said packing ring whereby said packing ring is urged both in a radial direction and in an endwise direction on the piston against the upper wall of said groove.

2. In combination, a piston having an annular groove therein, and a packing in said groove comprising a packing ring having a beveled inner face, a second ring having two angularly disposed flanges on its inner peripheral face, one of said flanges providing a seat in a median plane of the groove and the other of said flanges having beveled inner and outer faces, said outer face cooperating with the beveled face of said packing ring, and a spring follower ring supported upon said seat and underlying the inner beveled face of said second flange, said follower ring being adapted to urge said rings in a radial direction and said packing ring in a direction endwise of the piston and against the upper wall of said groove.

3. In combination, a piston having an annular groove with upper and lower walls therein, and a packing in said groove comprising a packing ring trapeziform in cross-section and of less width than the width of said groove, the inner peripheral face of said ring being beveled, a second ring having two angularly disposed flanges, one of said flanges providing an annular seat in a median plane of the groove and on the inner peripheral face of said ring and the other of said flanges having a beveled outer peripheral face cooperating with the beveled face of said packing ring, said second flange being of less radial depth than the first flange, and a spring follower ring supported upon said seat and underlying the inner surface of said second flange and adapted to urge said second ring against the lower wall of the groove and outwardly against said packing ring whereby said packing ring is urged both in a radial direction and in an endwise direction on the piston against the upper wall of said groove.

4. In combination, a piston having an annular groove therein, and a packing in said groove comprising a packing ring, the inner peripheral face of said ring being beveled, a second ring L-shaped in cross-section resting upon the lower wall of said groove, one flange of said second ring providing an internal annular seat and the other of said flanges having beveled inner and outer faces, said latter flange overhanging said first flange but being of less radial extent, the outer face of said latter flange cooperating with the beveled face of said packing ring, and a spring follower ring supported upon said seat and engaging the inner beveled face of said flange to hold the ring against the lower wall, and to urge said rings in a radial direction whereby said packing ring is urged in an endwise direction on the piston against the upper wall of said groove.

Signed by me at Boston, Massachusetts, this 4th day of August 1919.

LEWIS C. MARSHALL.